Jan. 25, 1927.
W. M. ROBERTS ET AL
1,615,345
ICE CREAM CONE MAKING MACHINE
Filed March 2, 1925
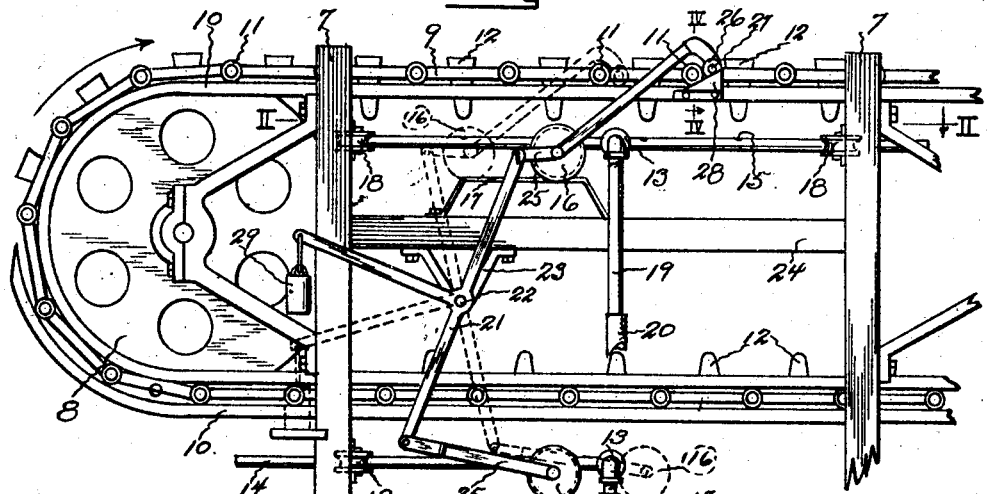
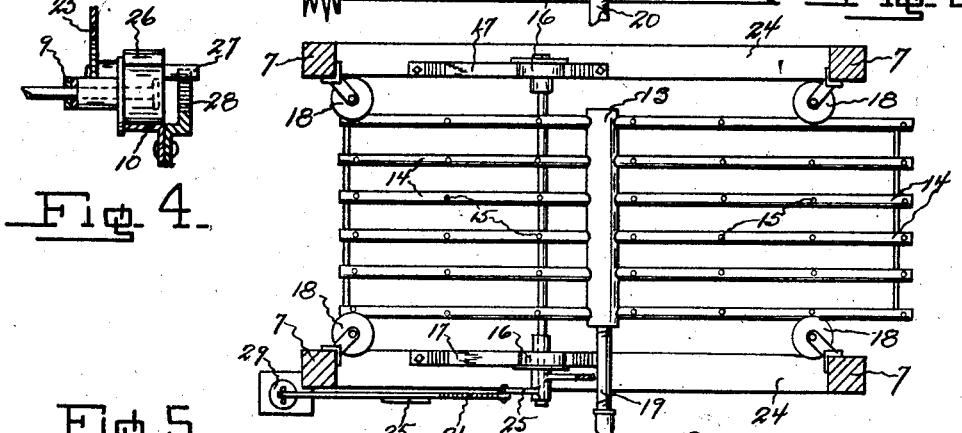
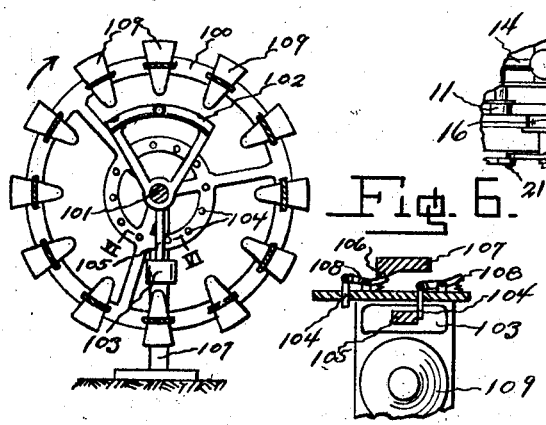
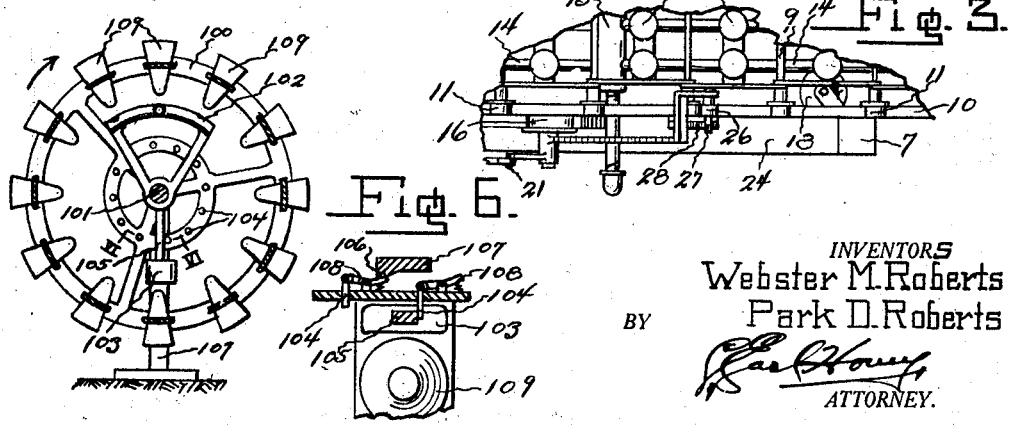
INVENTORS
Webster M. Roberts
Park D. Roberts
BY
ATTORNEY.

Patented Jan. 25, 1927.

1,615,345

UNITED STATES PATENT OFFICE.

WEBSTER M. ROBERTS AND PARK D. ROBERTS, OF ST. JOSEPH, MISSOURI.

ICE-CREAM-CONE-MAKING MACHINE.

Application filed March 2, 1925. Serial No. 12,765.

This invention relates to ice cream cone making machines, and particularly to that portion of the machine which functions as a heater for the oven and mold in which the cone is baked.

The present invention is applicable to any machine of the general character mentioned, in which it is desired to procure the greatest amount of work from the amount of gas or other fuel used.

The primary object of this invention is the provision of a burner for baking machines which is adapted to follow a group of molds for a portion of their traveled distance, and automatically return to the point of beginning to again travel with a slightly different group of molds for a like distance.

Another object of the present invention is to provide means for actuating the movable burner or heating unit that is simple in structure, easy to attach to any machine of the general character set forth, and may be operated directly from the moving parts of the baking machine.

A still further object of this invention is the provision of a movable burner for baking machines in general that will increase the efficiency of the machine, and materially cut down the amount of gas or other fuel normally used to operate the same.

With these general objects in view, and with the understanding that this invention is applicable to no particular ice cream cone making machine, the invention will be described with reference to the accompanying drawing, in which;

Figure 1 is a side elevation of an ice cream cone making machine with the movable burners and operating means thereon.

Fig. 2 is a horizontal section of the same taken on line II—II of Fig. 1.

Fig. 3 is a top view of a portion of the machine showing the conveyor gripping means and the releasing member.

Fig. 4 is an enlarged detailed section of the gripping means and releasing member taken on line IV—IV of Fig. 1.

Fig. 5 is a modified form of the invention showing its adaptation to other forms of machines and, Fig. 6 is an enlarged detailed section taken on line VI—VI of Fig. 5, showing a method of releasing the burner.

Referring at this time to the drawings in detail, wherein similar reference characters refer to like parts throughout the several views, and referring particularly to Figs. 1, 2, 3, 4 and 5, in which 7 indicates a series of upright posts adapted to support the several parts of the well-known cone making machine, including the wheel 8, over which passes conveyor 9; 10 the tracks over which the conveyor 9 is drawn by means of a plurality of rollers 11.

Conveyor 9 carries the several molds 12 which are arranged in transverse, equally spaced rows across the machine. The oven casing is not here shown.

In ordinary practice, it has been customary to provide a heating means or burner for the molds 12 which burns continuously and acts directly on the mold only when the same passes over the jet of flame. Obviously, this causes a vast amount of heat to be wasted by passing upwardly between the successive rows of molds. To obtain the greatest amount of work from the burners, and to shorten the baking time, this invention contemplates the use of a heating unit comprising a cross head 13 having a plurality of outwardly extending pipes 14 with jet openings 15 drilled therein at distances apart corresponding to the space between the transverse rows of molds 12. This entire unit may be mounted for movement beneath the conveyor 9 by flanged wheels 16, riding over tracks 17, and secured against twisting or transverse movement by guide wheels 18, rigidly carried by each of posts 7. Ordinary pipes 19, having a flexible portion 20 to permit of necessary travel, supply the cross head 13 and pipes 14 with gas.

Several methods of imparting motion to the heating unit as a whole may be used. Since the rate of travel of the heating unit must be the same as the conveyor 9 to properly carry out this invention, it is preferred to take the pulling power directly from said conveyor. In the preferred form shown in the drawings, member 21 is pivotally mounted as at 22 to bracket 23 supported by beam 24. The upper and lower ends respectively of member 21 connect to wheels 16 through links 25. Upper link 25 continues upwardly, inwardly and then downwardly as shown in Fig. 3 to support a roller 26 which engages conveyor roller 11 during the time the heating unit is being pulled in the direction of travel of conveyor 9. The distance this roller travels in engagement with any one of conveyor rollers 11 is equal to the distance between molds 12. When this distance is traveled, projection 27, integral with roller 26, rides upwardly along inclined portion of a releasing member 28, lifts roller 26 from engagement with conveyor roller 11, and permits weight 29 to quickly draw the heating unit back to the point of beginning. In Fig. 1, the mechanism is on the verge of being released to return to this point of beginning shown in dotted lines.

It is obvious that the heat wasted during the return of the heating unit is negligible, and that baking time may be appreciably cut down by causing the jets of flame to act directly upon the mold while the same is traveling therewith at the same rate of speed.

Many modifications in structure may be made, and the invention applied to baking machines of various types. Figs. 5 and 6 show the invention applied to a machine having a drum-like conveyor 100, which revolves around shaft 101. In this instance, the burner 102 is loosely mounted upon shaft 101 and is held in position by weight 103. In turning, in the direction of the arrow, one of a series of pins 104 engages arm 105 and carries it, together with the burner 102, a short distance around and to a point where releasing member 106, supported by leg 107, engages dog 108, pulls pin 104 out of engagement with arm 105 and allows weight 103 to return the burner 102 to the point of beginning. This construction also performs the function of keeping the jets of flame directly under the molds while the same are revolving.

While this invention has been especially described with reference to the accompanying drawing, it must be understood that the same is limited only by the accompanying claims.

What is claimed is:

1. In a device of the character described, a continuously moving conveyor, a plurality of molds carried thereby and means for heating said molds mounted for reciprocating movement beneath said conveyor, said heating means moving in the same direction as said molds during one of its strokes and oppositely thereto during the other of said strokes.

2. In a device of the character described, a continuously moving conveyor, a plurality of molds carried thereby, means for heating said molds movably mounted for intermittent travel therewith and means for imparting motion thereto comprising a member carried by said heating means adapted to periodically engage and disengage said conveyor.

3. In a device of the character described, a continuously moving conveyor, a plurality of molds carried thereby, means for heating said molds movably mounted for intermittent travel therewith and means for supporting and guiding said heating means said supporting means including means for intermittently engaging said conveyor.

4. In a device of the character described, a conveyor, a plurality of molds carried thereby, means for heating said molds reciprocably mounted adjacent thereto and means for imparting reciprocating motion to said heating means.

5. In combination with a machine of the character described having a conveyor and a plurality of molds mounted on said conveyor, a burner for heating said molds movably mounted therebeneath, means operable by said conveyor for intermittently causing said burner to move in the same direction with said molds, a releasing member for said operating means and means for returning said burner to the point of beginning.

6. In combination with a machine of the character described having a conveyor and a plurality of equally spaced molds mounted on said conveyor, heating means movably mounted beneath a group of said molds having a burner disposed below each mold, means operable by said conveyor for moving said heating means with said molds at a speed equal to that of said molds and means for releasing and returning said heating means to the point of beginning whereby each of said burners is maintained in direct heating relation to a mold.

In testimony whereof we hereunto affix our signatures this 17th day of February, 1925.

WEBSTER M. ROBERTS.
PARK D. ROBERTS.